US 8,294,544 B2

(12) United States Patent
Ikriannikov et al.

(10) Patent No.: US 8,294,544 B2
(45) Date of Patent: Oct. 23, 2012

(54) METHOD FOR MAKING MAGNETIC COMPONENTS WITH M-PHASE COUPLING, AND RELATED INDUCTOR STRUCTURES

(75) Inventors: Alexandr Ikriannikov, Castro Valley, CA (US); Anthony Stratakos, Berkeley, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 458 days.

(21) Appl. No.: 12/404,993

(22) Filed: Mar. 16, 2009

(65) Prior Publication Data

US 2009/0237197 A1 Sep. 24, 2009

Related U.S. Application Data

(60) Provisional application No. 61/036,836, filed on Mar. 14, 2008, provisional application No. 61/046,736, filed on Apr. 21, 2008.

(51) Int. Cl.
*H01F 17/06* (2006.01)
*H01F 27/28* (2006.01)
*H01F 27/24* (2006.01)

(52) U.S. Cl. ........ 336/178; 336/170; 336/184; 336/212; 336/215; 336/217; 336/222

(58) Field of Classification Search ................... 336/170, 336/178, 184, 212, 215, 217, 222
See application file for complete search history.

(56) References Cited

U.S. PATENT DOCUMENTS

| | | | |
|---|---|---|---|
| 2,212,543 A | 8/1940 | Jovy | |
| 3,878,495 A * | 4/1975 | Thomas | 336/212 |
| 4,455,545 A | 6/1984 | Shelly | |
| 4,488,136 A | 12/1984 | Hansen et al. | |
| 4,531,085 A | 7/1985 | Mesenhimer | |
| 5,003,277 A | 3/1991 | Sokai et al. | |
| 5,023,578 A | 6/1991 | Kaneko et al. | |
| 5,123,989 A | 6/1992 | Horiishi et al. | |
| 5,161,098 A | 11/1992 | Balakrishnan | |

(Continued)

FOREIGN PATENT DOCUMENTS

DE 922 423 1/1955

(Continued)

OTHER PUBLICATIONS

Wong, Pit-Leong, et al.; A Novel Modeling Concept for Multi-coupling Core Structures; Center for Power Electronics Systems; IEEE; 2001.*

(Continued)

*Primary Examiner* — Mohamad Musleh
*Assistant Examiner* — Tsz Chan
(74) *Attorney, Agent, or Firm* — Lathrop & Gage LLP

(57) ABSTRACT

An M-phase coupled inductor including a magnetic core and M windings, where M is an integer greater than one. The magnetic core is formed of a core material, and the magnetic core includes a first outer leg forming a first gap. The first gap includes a first gap material having lower magnetic permeability than the core material. Each winding is wound at least partially around at least a portion of the magnetic core, and each winding has a respective leakage inductance. The first gap causes the leakage inductances to be greater than if the first outer leg did not form the first gap. The coupled inductor may be used in a power supply, and the power supply may be used in a computing apparatus.

35 Claims, 9 Drawing Sheets

U.S. PATENT DOCUMENTS

| | | | |
|---|---|---|---|
| 5,177,460 A | 1/1993 | Dhyanchand et al. | |
| 5,182,535 A | 1/1993 | Dhyanchand | |
| 5,225,971 A | 7/1993 | Spreen | |
| 5,353,001 A | 10/1994 | Meinel et al. | |
| 5,436,818 A | 7/1995 | Barthold | |
| 5,469,334 A | 11/1995 | Balakrishnan | |
| 5,568,111 A | 10/1996 | Metsler | |
| 5,574,420 A | 11/1996 | Roy et al. | |
| 5,631,822 A | 5/1997 | Silberkleit et al. | |
| 5,764,500 A | 6/1998 | Matos | |
| 5,903,182 A | 5/1999 | Jordan | |
| 5,939,966 A | 8/1999 | Shin'ei | |
| 6,018,468 A | 1/2000 | Archer et al. | |
| 6,060,977 A | 5/2000 | Yamamoto et al. | |
| 6,147,584 A | 11/2000 | Shin'el | |
| 6,342,778 B1 | 1/2002 | Catalano et al. | |
| 6,348,848 B1 | 2/2002 | Herbert | |
| 6,356,179 B1 | 3/2002 | Yamada | |
| 6,362,986 B1 | 3/2002 | Schultz et al. | |
| 6,377,155 B1 | 4/2002 | Allen et al. | |
| 6,388,896 B1 | 5/2002 | Cuk | |
| 6,420,953 B1 | 7/2002 | Dadafshar | |
| 6,477,414 B1 | 11/2002 | Silvian | |
| 6,538,909 B2 * | 3/2003 | Goodarzi et al. | 363/98 |
| 6,578,253 B1 | 6/2003 | Herbert | |
| 6,714,428 B2 * | 3/2004 | Huang et al. | 363/89 |
| 6,737,951 B1 | 5/2004 | Decristofaro et al. | |
| 6,784,644 B2 | 8/2004 | Xu et al. | |
| 6,867,678 B2 | 3/2005 | Yang | |
| 6,903,648 B2 * | 6/2005 | Baumann et al. | 336/212 |
| 6,906,601 B2 * | 6/2005 | Fayyaz | 333/156 |
| 6,979,980 B1 | 12/2005 | Hesterman et al. | |
| 6,980,077 B1 | 12/2005 | Chandrasekaran et al. | |
| 7,148,661 B2 * | 12/2006 | Trainer et al. | 323/207 |
| 7,199,695 B1 | 4/2007 | Zhou et al. | |
| 7,233,132 B1 | 6/2007 | Dong et al. | |
| 7,248,139 B1 | 7/2007 | Podlisk et al. | |
| 7,280,025 B2 | 10/2007 | Sano | |
| 7,352,269 B2 | 4/2008 | Li et al. | |
| 7,423,894 B2 | 9/2008 | Ilic | |
| 7,492,246 B2 | 2/2009 | Chang | |
| 7,498,920 B2 | 3/2009 | Sullivan et al. | |
| 7,567,163 B2 | 7/2009 | Dadafshar et al. | |
| 7,994,888 B2 | 8/2011 | Ikriannikov | |
| 2001/0043135 A1 | 11/2001 | Yamada et al. | |
| 2002/0093413 A1 | 7/2002 | Shin'ei | |
| 2002/0159282 A1 * | 10/2002 | Perol | 363/134 |
| 2003/0115013 A1 | 6/2003 | Dendinger | |
| 2004/0017276 A1 * | 1/2004 | Chen et al. | 336/192 |
| 2004/0085173 A1 | 5/2004 | Decristofaro et al. | |
| 2004/0113741 A1 * | 6/2004 | Li et al. | 336/212 |
| 2005/0024179 A1 | 2/2005 | Chandrasekaran et al. | |
| 2005/0128040 A1 | 6/2005 | Gray et al. | |
| 2006/0158297 A1 | 7/2006 | Sutardja | |
| 2006/0197510 A1 | 9/2006 | Chandrasekaran | |
| 2006/0279972 A1 * | 12/2006 | Shao et al. | 363/127 |
| 2007/0097571 A1 | 5/2007 | Dinh et al. | |
| 2007/0175701 A1 | 8/2007 | Xu et al. | |
| 2007/0176726 A1 | 8/2007 | Xu et al. | |
| 2007/0268104 A1 | 11/2007 | Chan et al. | |
| 2008/0024259 A1 | 1/2008 | Chandrasekaran et al. | |
| 2008/0150666 A1 | 6/2008 | Chandrasekaran et al. | |
| 2008/0169769 A1 | 7/2008 | Lee | |
| 2008/0205098 A1 | 8/2008 | Xu et al. | |
| 2008/0246577 A1 | 10/2008 | Sullivan et al. | |
| 2009/0001945 A1 | 1/2009 | Wickersham et al. | |
| 2009/0179723 A1 | 7/2009 | Ikriannikov et al. | |
| 2009/0231081 A1 | 9/2009 | Ikriannikov et al. | |

FOREIGN PATENT DOCUMENTS

| | | |
|---|---|---|
| DE | 26 53 568 | 6/1978 |
| DE | 3123006 A1 * | 1/1983 |
| DE | 37 03 561 | 8/1988 |
| DE | 101 05 087 | 8/2001 |
| EP | 0 012 629 | 6/1980 |
| EP | 0 142 207 | 5/1985 |
| EP | 0 225 830 | 6/1987 |
| EP | 0 577 334 | 1/1994 |
| EP | 0 755 060 | 1/1997 |
| EP | 1 519 392 | 3/2005 |
| EP | 1 632 964 | 3/2006 |
| EP | 1 833 165 | 9/2007 |
| EP | 1 835 604 | 9/2007 |
| EP | 1 950 773 | 7/2008 |
| JP | 60-015908 | 1/1985 |
| JP | 11 144983 | 5/1999 |
| JP | 11 307369 | 11/1999 |
| JP | 2002057049 | 2/2002 |
| WO | WO 2006/026674 | 3/2006 |

OTHER PUBLICATIONS

PCT/US09/37320 International Search Report and Written Opinion mailed Jun. 30, 2009, 19 pages.

PCT/US09/37315 International Search Report and Written Opinion mailed Aug. 26, 2009, 13 pages.

PCT Application No. PCT/US09/37315, Response to Written Opinion filed Jan. 14, 2010, 31 pages.

U.S. Appl. No. 12/538,707, Issue Fee payment filed Dec. 20, 2011, 2 pages.

U.S. Appl. No. 12/830,849, Non-Final Rejection issued on Dec. 19, 2011, 12 pages.

International Application No. PCT/US10/45013, International Preliminary Report on Patentability mailed Sep. 5, 2011, 26 pages.

Chandrasekaran et al., "Integrated magnetic for interleaved DC-DC boost converter for fuel cell powered vehicles" 2004 35th Annual IEEE Power Electronics Specialists Conference pp. 356-361.

PCT/US10/45013, International Search Report and Written Opinion, Jan. 21, 2011, 15 pages.

U.S. Appl. No. 12/538,707, Notice of Allowance dated Sep. 26, 2011, 8 pages.

PCT Application No. PCT/US10/45013, Response to Written Opinion filed Jun. 10, 2011, 30 page.

PCT Application No. PCT/US09/37315, International Preliminary Report on Patentability dated Jul. 7, 2010, 16 pages.

Dong et al., Twisted Core Coupled Inductors for Microprocessor Voltage Regulators, Power Electronics Specialists Conference, pp. 2386-2392, Jun. 17-21, 2007.

Dong et al., the Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Wong, Pit-Leong, et al., "Investigating Coupling Inductors in the Interleaving QSW VRM" Applied Power Electronics Conference and Exposition, 2000. APEC 2000. Fifteenth Annual IEEE; Mar. 2000; pp. 973-978.

Wong, Pit-Leong, et al.; A Novel Kookel6rT Concept for Multi-coupling Core Structures; Center for Power Electronics Systems; IEEE, 2001.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

U.S. Appl. No. 12/830,849, Notice of Allowance issued Apr. 3, 2012, 7 pages.

U.S. Appl. No. 12/830,849, Response to Office Action filed Mar. 19, 2012, 11 pages.

* cited by examiner

US 8,294,544 B2

METHOD FOR MAKING MAGNETIC COMPONENTS WITH M-PHASE COUPLING, AND RELATED INDUCTOR STRUCTURES

CROSS-REFERENCE TO RELATED APPLICATIONS

This application claims benefit of priority to U.S. Provisional Patent Application Ser. No. 61/036,836 filed 14 Mar. 2008 and to U.S. Provisional Patent Application Ser. No. 61/046,736 filed 21 Apr. 2008. Each of the above-identified patent applications are incorporated herein by reference.

BACKGROUND

Switching DC-to-DC converters having a multiphase coupled inductor topology are described in U.S. Pat. No. 6,362,986 to Schultz et al. ("Shultz '986"), the disclosure of which is incorporated herein by reference. These converters have advantages, including reduced ripple current in the inductors and the switches, which enables reduced per-phase inductance or reduced switching frequency over converters having conventional multi-phase DC-to-DC converter topologies. As a result, DC-to-DC converters with magnetically coupled output inductors achieve a superior transient response without an efficiency penalty compared with conventional multiphase topologies. This allows a significant reduction in output capacitance resulting in smaller, lower cost solutions.

As discussed in Schultz '986, performance of a DC-to-DC converter utilizing a coupled inductor is affected by the coupled inductor's leakage inductance. Accordingly, it may be desirable to customize or adjust a coupled inductor's leakage inductance for the inductor's application.

Some coupled inductors have been proposed. For example, FIGS. 1-3 show one coupled inductor 100 developed by Volterra Semiconductor Corporation. In particular, FIG. 1 shows a side plan view, FIG. 2 shows a cross sectional view, and FIG. 3 shows an end plan view of coupled inductor 100. Coupled inductor 100, which has a height 106, includes a magnetic core 102 and two or more windings 104. FIG. 4 shows a side perspective view of one winding 104.

As another example, Dong et al. propose a two phase "twisted core" coupled inductor in a paper entitled "Twisted Core Coupled Inductors for Microprocessor Voltage Regulators." However, this coupled inductor has a complex core with poor volume utilization. Additionally, leakage inductance is defined by the distance between vertical core structures and the height of these structures—accordingly, leakage inductance is difficult to control. Furthermore, the twisted core coupled inductor's leakage path makes the inductor's design complex.

Additionally, Dong et al. propose coupled inductors in a paper entitled "The Short Winding Path Coupled Inductor Voltage Regulators." FIG. 5 shows a top plan view of one coupled inductor 500, which represents the multiphase coupled inductors of this Dong paper. Windings are not shown in FIG. 5 to more clearly show core 502. However, FIG. 6 shows inductor 500 including its windings 602.

Core 502 includes a respective leg 504 for each phase. Each leg 504 has a width 508, and adjacent legs 504 are separated by a window 506 having a width 510. Accordingly, windings 602 have a pitch 604, as shown in FIGS. 6 and 7. Window widths 510 are relatively large and are on the order of leg widths 508. Large window widths 510 are required to provide magnetic flux leakage paths such that leakage inductance is sufficiently large. Leakage inductance is changed by varying the geometry of core 502 and/or by changing window widths 510. Windows 506 also accommodate a respective winding tab, as shown in FIG. 6.

FIG. 7 shows a cross sectional view of inductor 500 along line A-A of FIG. 5. Each area 702 corresponds to the area of a respective leg 504, and each area 704 corresponds to the area of a respective window 506. As seen from FIG. 7, a large portion of coupled inductor 500's volume is not occupied by magnetic material.

SUMMARY

An M-phase coupled inductor includes a magnetic core and M windings, where M is an integer greater than one. The magnetic core is formed of a core material, and the magnetic core includes a first outer leg forming a first gap. The first gap includes a first gap material having lower magnetic permeability than the core material. Each winding is wound at least partially around at least a portion of the magnetic core, and each winding has a respective leakage inductance. The first gap causes the leakage inductances to be greater than if the first outer leg did not form the first gap.

An M-phase power supply includes a coupled inductor and M switching circuits, where M is an integer greater than one. The coupled inductor includes a magnetic core formed of a core material, and the coupled inductor includes a first outer leg. The first outer leg forms a first gap including a first gap material having lower magnetic permeability than the core material. The coupled inductor further includes M windings, where each winding is wound at least partially around at least a portion of the magnetic core. Each winding has a respective first end, a respective second end, and a respective leakage inductance. Each first end is electrically coupled to a common first node, and each switching circuit is electrically coupled to the second end of a respective winding. The switching circuits are configured and arranged to switch the second end of their respective winding between at least two different voltages. The first gap causes the leakage inductances to be greater than if the first outer leg did not form the first gap.

A computing apparatus includes a computer processor and an M-phase power supply electrically coupled to the processor for at least partially powering the processor. M is an integer greater than one. The power supply includes a coupled inductor and M switching circuits. The coupled inductor includes a magnetic core formed of a core material, and the coupled inductor includes a first outer leg. The first outer leg forms a first gap including a first gap material having lower magnetic permeability than the core material. The coupled inductor further includes M windings, where each winding is wound at least partially around at least a portion of the magnetic core. Each winding has a respective first end, a respective second end, and a respective leakage inductance. Each first end is electrically coupled to a common first node, and each switching circuit is electrically coupled to the second end of a respective winding. The switching circuits are configured and arranged to switch the second end of their respective winding between at least two different voltages. The first gap causes the leakage inductances to be greater than if the first outer leg did not form the first gap.

DETAILED DESCRIPTION OF EMBODIMENTS

Figure 1:
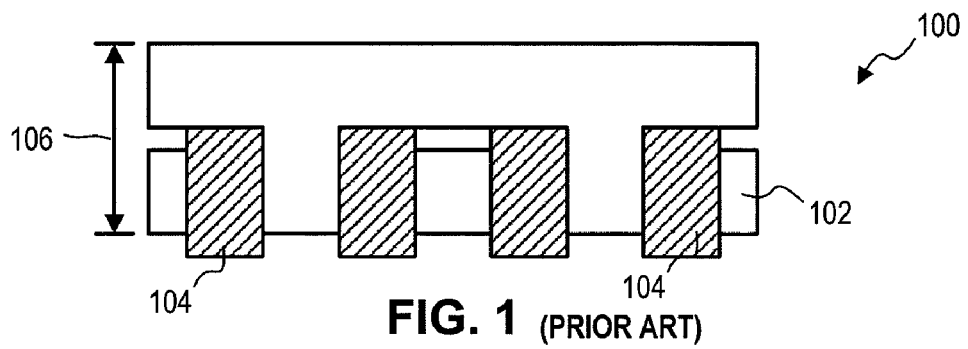
FIG. 1 shows a side plan view of one multiphase coupled inductor.

It is noted that, for purposes of illustrative clarity, certain elements in the drawings may not be drawn to scale. Specific instances of an item may be referred to by use of a numeral in parentheses (e.g., winding 816(1)) while numerals without parentheses refer to any such item (e.g., windings 816).

Figure 8:
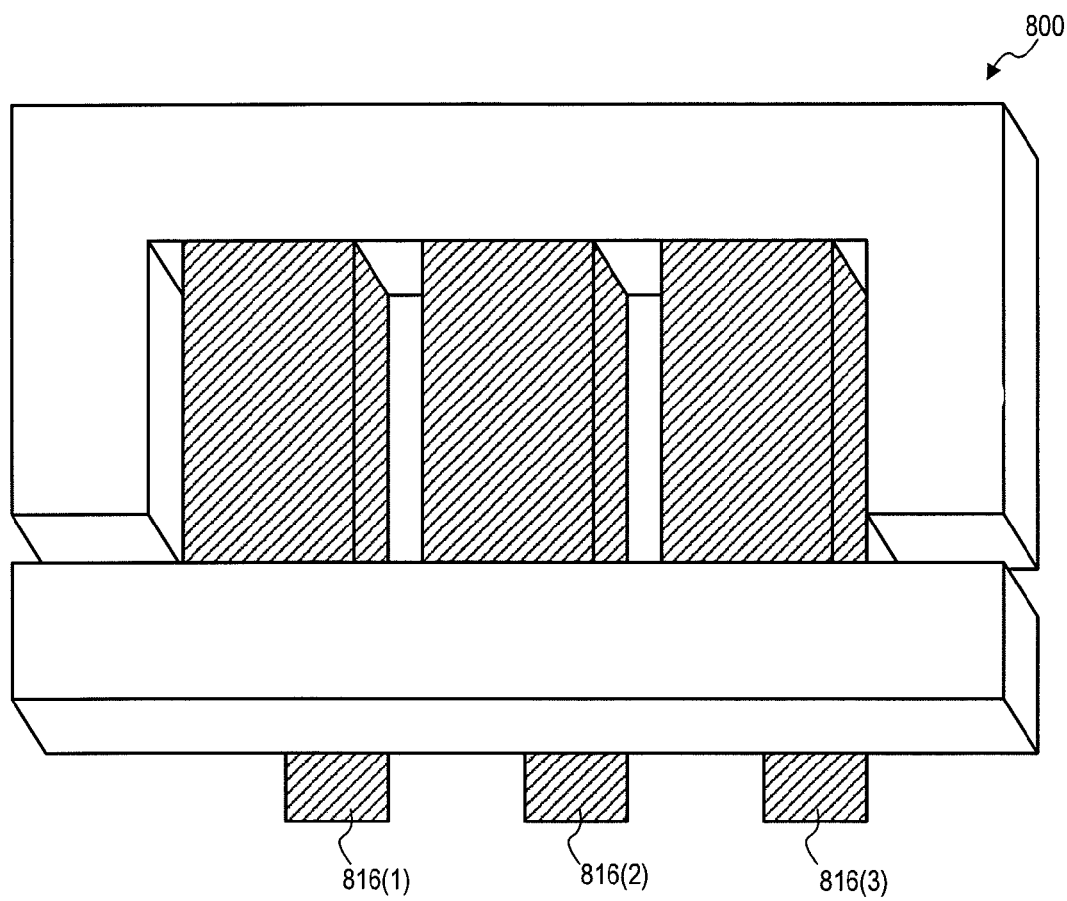
FIG. 8 shows a top perspective view of one coupled inductor, according to an embodiment.
Figure 9:
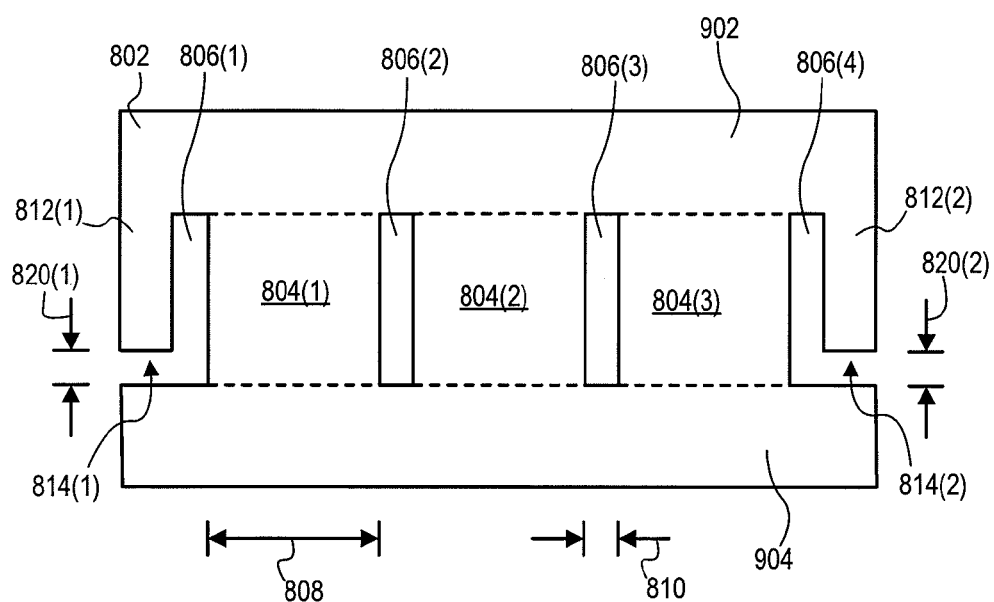
FIG. 9 shows a top plan view of the coupled inductor of FIG. 8 without windings.
Figure 10:
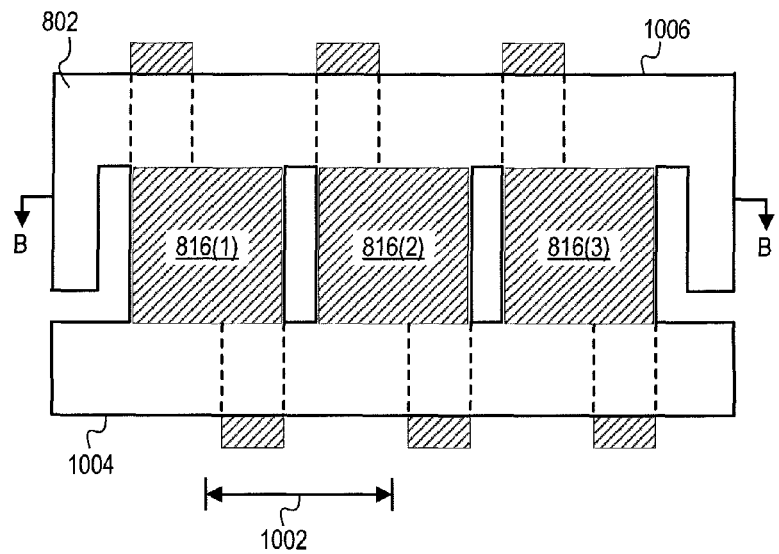
FIG. 10 shows a top plan view of the coupled inductor of FIG. 8 with windings.
Figure 11:
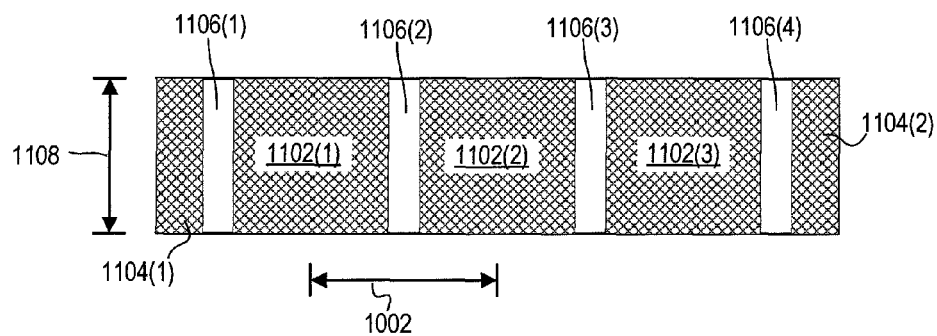
FIG. 11 shows a cross sectional view of the coupled inductor of FIGS. 8-10.

FIG. 8 shows a top perspective view, and FIG. 9 shows a top plan view of one M-phase coupled inductor 800. Windings 816 are not shown in FIG. 9 to more clearly show magnetic core 802. However, FIG. 10 shows a top plan view of coupled inductor 800 including windings 816. Edges of windings 816 that are not visible in the top plan view are shown by dashed lines in FIG. 10. FIG. 11 shows a cross sectional view of coupled inductor 800 taken along line B-B of FIG. 10. Coupled inductor 800 has height 1108, as shown in FIG. 11. Although FIGS. 8-11 show an example of coupled inductor 800 where M is equal to three, M can be any integer greater than one.

Windings 816 have pitch 1002, as shown in FIGS. 10-11. FIGS. 10-11 show pitch 1002 being the same as pitch 604 of inductor 500 (FIG. 6) to facilitate comparison of coupled inductor 800 with coupled inductor 500. However, pitch 1002 may be varied as a matter of design choice. For example, pitch 1002 may be equal to a pitch of power stages of a DC-to-DC converter that coupled inductor 800 is installed in to minimize circuit board trace length and to maximize DC-to-DC converter power density.

Magnetic core 802 is formed of a ferrite material, a powdered iron material, or other magnetic core material. Magnetic core 802 includes a pair of outer legs 812. At least one outer leg 812 forms a gap 814 having a thickness 820. Each gap 814 need not necessarily have the same thickness 820. Gaps 814 include (e.g., are at least partially filled with) a material having a lower magnetic permeability than the one or more materials forming core 802. For example, gaps 802 may include a non-magnetic material such as air, insulating tape, plastic, glue, and/or paper. As another example, gaps 802 may optionally include a saturable magnetic material that saturates during anticipated normal operation of coupled inductor 800, so that windings 816 have non-linear leakage inductance values. Each gap 814 need not necessarily be filled with the same gap material. Gaps 814 create leakage flux paths and are the most significant contributor to the respective leakage inductance of each winding 816. Accordingly, leakage inductance may be varied by varying thickness 820 of one or more gaps 814.

Figure 12:
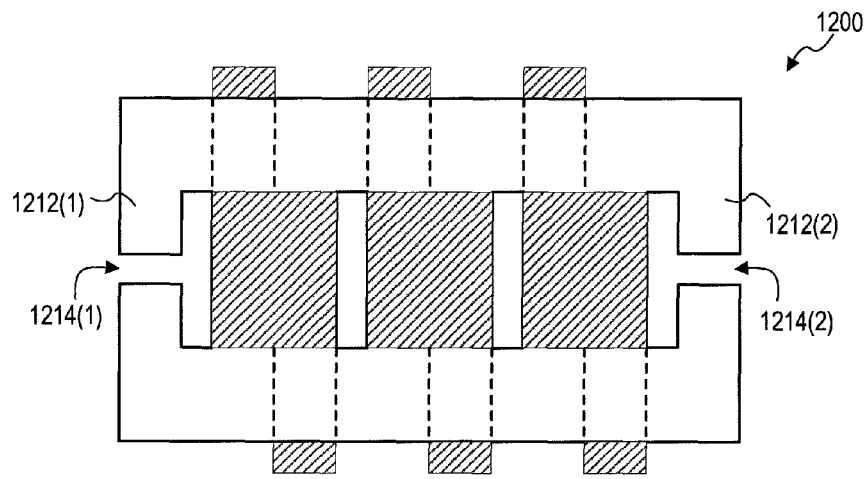
FIG. 12 shows a top plan view of one coupled inductor, according to an embodiment.
Figure 13:
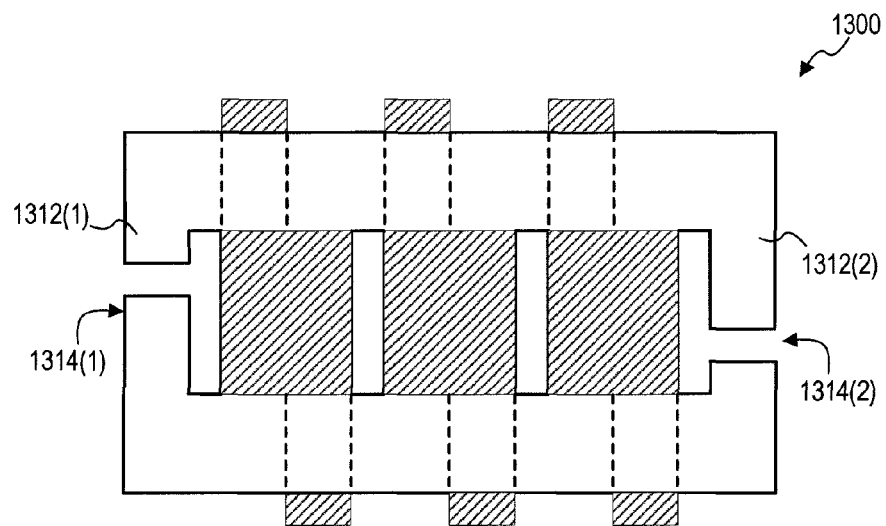
FIG. 13 shows a top plan view of one coupled inductor, according to an embodiment.

The location of gaps 814 in outer legs 812 may be varied. For example, FIGS. 12 and 13 respectively show coupled inductors 1200 and 1300, which are embodiments of coupled inductor 800 where the outer legs 1212, 1312 form gaps 1214, 1314 in different locations than shown in FIGS. 8-10.

Core 802 further includes M inner legs 804 disposed between pair of outer legs 812. Each inner leg has a respective width 808. A respective winding 816 is at least partially wound around each inner leg 804, and each winding 816 is accordingly disposed between pair of outer legs 812. Although inner legs 804 and outer legs 812 are shown as rectangular, their shape could be varied (e.g., rounded). Also shown in FIG. 9 are first and second end magnetic elements 902, 904.

Figure 14:
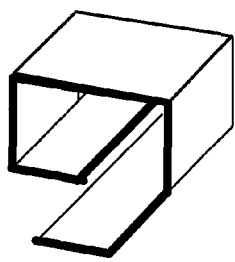
FIGS. 14 and 15 show side perspective views of one winding, according to an embodiment.
Figure 15:
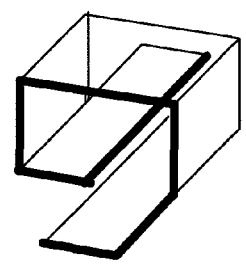
Figure 16:
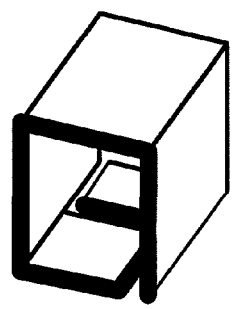
FIG. 16 shows a side perspective view of one winding, according to an embodiment.
Figure 17:
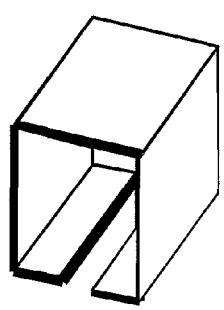
FIG. 17 shows a side perspective view of one winding, according to an embodiment.
Figure 18:
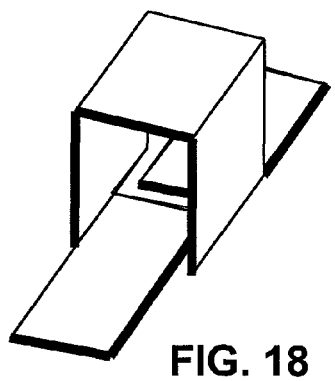
FIG. 18 shows a side perspective view of one winding, according to an embodiment.

Windings 816 are, for example, foil windings having a substantially rectangular cross section. In some embodiments, windings 816 are single turn, single layer windings having substantially rectangular cross section. FIG. 14 is a side perspective view and FIG. 15 is a partially transparent side perspective view of the embodiment of winding 816 shown in FIGS. 8, 10, 12, and 13. However, windings 816 may have different configurations than shown in FIGS. 8, 10, 12, and 13. For example, FIGS. 16-18 show examples of other possible configurations of windings 816.

Figure 19:
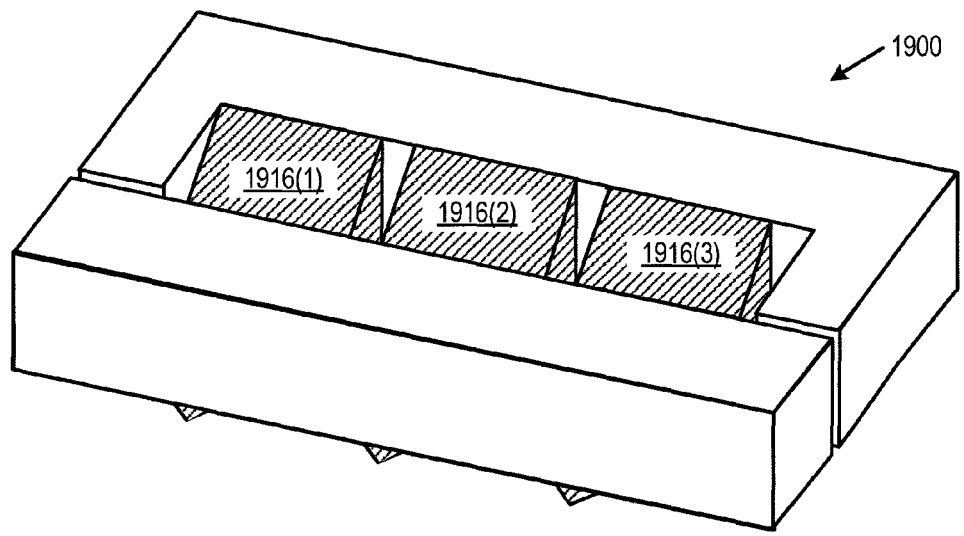
FIG. 19 shows a top perspective view of one coupled inductor, according to an embodiment.
Figure 20:
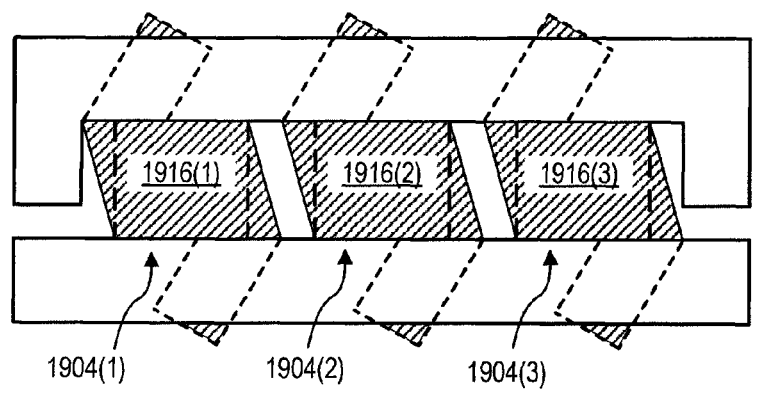
FIG. 20 shows a top plan view of the coupled inductor of FIG. 19.

As another example, FIG. 19 shows a top perspective view and FIG. 20 shows a top plan view of coupled inductor 1900, which is an embodiment of coupled inductor 800 having windings 1916. Windings 1916 are, for example, formed from a rectangular sheet of conductive material (e.g., copper). Edges of windings 1916 not visible in the top plan view are outlined with dashed lines. Additionally, edges of inner legs 1904 not visible in the top plan view of FIG. 20 are also shown with dashed lines.

Figure 21:
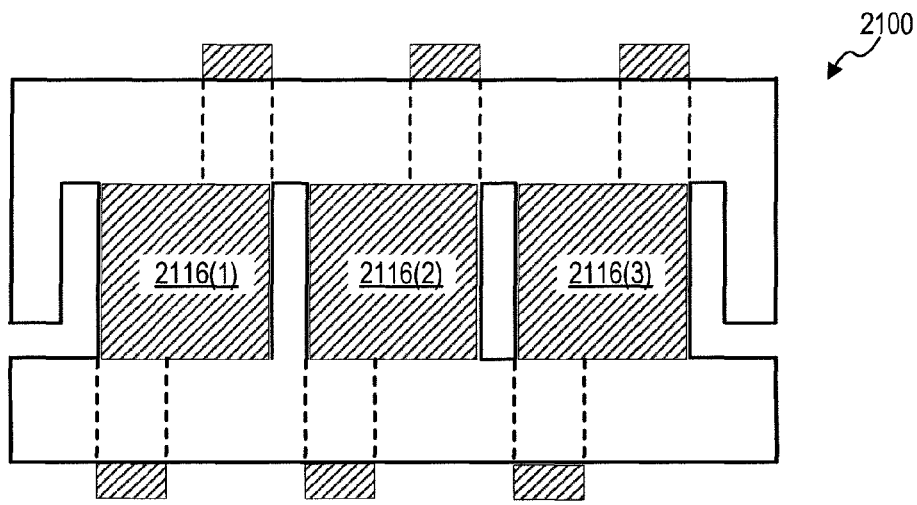
FIG. 21 shows a top plan view of one coupled inductor, according to an embodiment.

As yet another example, FIG. 21 shows a top plan view of one coupled inductor 2100 including windings 2116. Coupled inductor 2100 differs from coupled inductor 800 in that windings 2116 are mirror images of windings 816. One possible reason to mirror image windings is to optimally accommodate power stage size and/or geometry. Additionally, windings 816 could be modified such that pitch 1002 is not the same for each pair of windings, such as to accommodate power stage geometry. Furthermore, windings 816 could be modified to include or be coupled to thru-hole pins.

Furthermore, although each winding 816 is shown as having an end extending from each of sides 1004 and 1006 (see FIG. 10), windings 816 could extend from inductor 800 in a different manner, or not extend at all. For example, each end of one or more windings 816 could extend from a common side of inductor 800, such as to accommodate power stage layout requirements.

Each inner leg 804 is separated from an adjacent inner leg 804 or an outer leg 812 by a window 806 having a width 810. Each window 806 need not necessarily have the same window width 810. Window widths 810 can be made small because inner legs 804 do not need to be separated by air gaps to elevate leakage inductance. Instead, as discussed above, leakage inductance is primarily created by gaps 814. Indeed, window widths 810 can be made as small as possible, such as just large enough to prevent windings 816 from shorting. For example, in some embodiments, window widths 810 are less than 50%, 25%, or 10% of inner leg widths 808. Accordingly, in some embodiments, adjacent inner legs 804 are separated by a separation distance (i.e., a window width 810) that is less than 50%, 25%, or 10% of the respective width 808 of either adjacent inner leg. Configuring coupled inductor 800 such that window widths 810 are relatively small may advantageously increase the portion of coupled inductor 800's volume that is occupied by magnetic core material, as discussed below.

Figure 2:
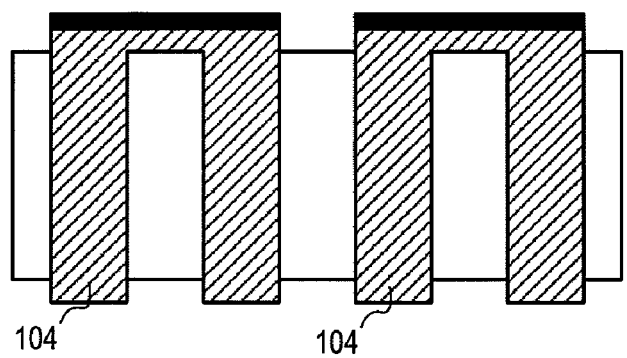
FIG. 2 shows a cross sectional view of the coupled inductor of FIG. 1.
Figure 3:
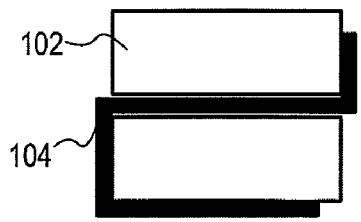
FIG. 3 shows an end plan view of the coupled inductor of FIG. 1.
Figure 5:
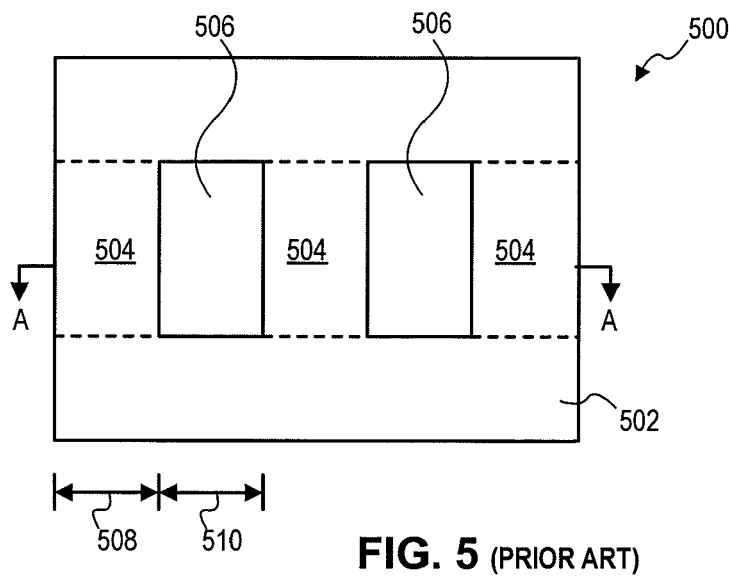
FIG. 5 shows a top plan view of one multiphase coupled inductor without windings.
Figure 6:
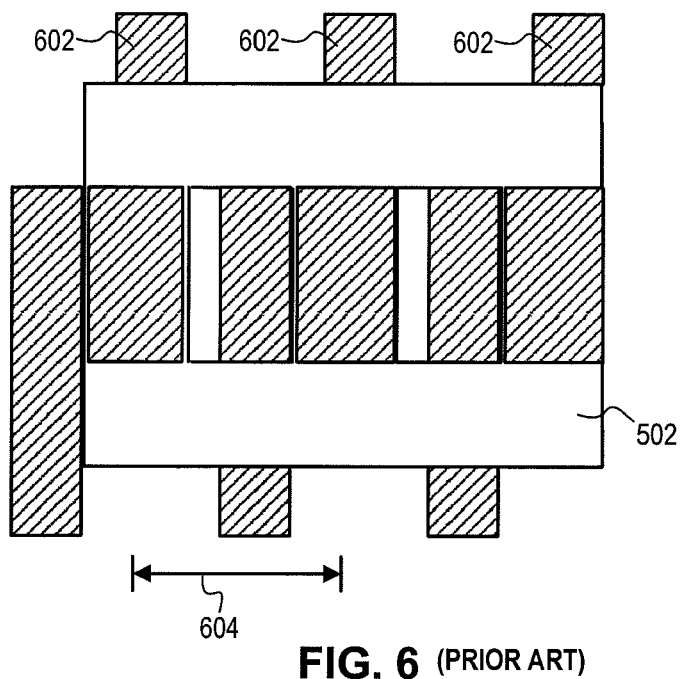
FIG. 6 shows a top plan view of the coupled inductor of FIG. 5 with windings.
Figure 7:
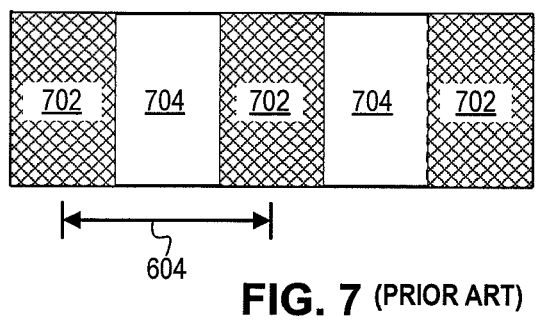
FIG. 7 shows a cross sectional view of the coupled inductor of FIGS. 5 and 6.

Coupled inductor 800 has a number of advantages over other coupled inductors. For example, as discussed above, leakage inductance is adjustable by merely varying thickness 820 of one or more gaps 814. Accordingly, leakage inductance may be easily adjusted, such as by grinding down one or more of outer legs. 812. In contrast, core geometry and/or window widths must be changed to adjust leakage inductance of coupled inductor 100 (FIGS. 1-3) or coupled inductor 500 (FIGS. 5-7).

As another example, although the relative proportion of inner legs 804, windows 806, and outer legs 812 may be varied as a design choice, the majority of coupled inductor 800's volume may be occupied by magnetic core material. For example, in the cross section of FIG. 11, areas 1102 represent inner legs 804; areas 1104 represent outer legs 812; and areas 1106 represent windows 806. Accordingly, in the example of FIG. 11, the majority of coupled inductor 800's volume is occupied by magnetic material. This increases magnetizing inductance and thereby increases magnetic coupling between windings, increases uniformity of leakage inductance and magnetizing inductance among windings, increases resistance to saturation from winding current mismatch, and/or reduces core losses. Additionally, the large magnetic coupling offered by some embodiments of coupled inductor 800 may allow use of a lower permeability core material, thereby reducing core losses.

In contrast, in some other coupled inductors, such as coupled inductor 100 (FIGS. 1-3) or coupled inductor 500 (FIGS. 5-7), a significant portion of the inductor's volume must be free from magnetic material to maintain required spacing between legs. Such fact can be appreciated by comparing FIG. 7 and FIG. 11, where coupled inductor 800 includes significantly more magnetic core material than coupled inductor 500 at the same winding pitch.

Figure 4:
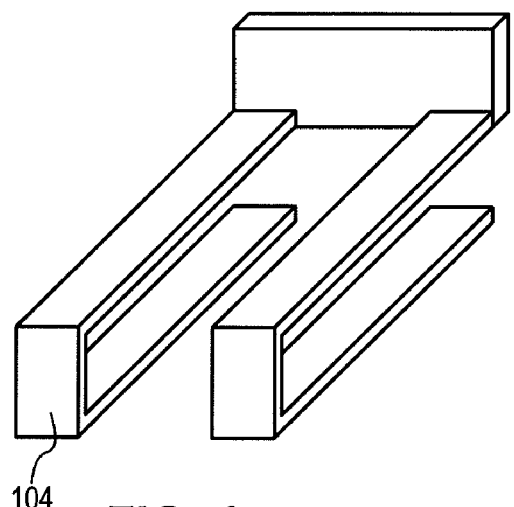
FIG. 4 shows a side perspective view of a winding of the coupled inductor of FIG. 1.
Figure 22:
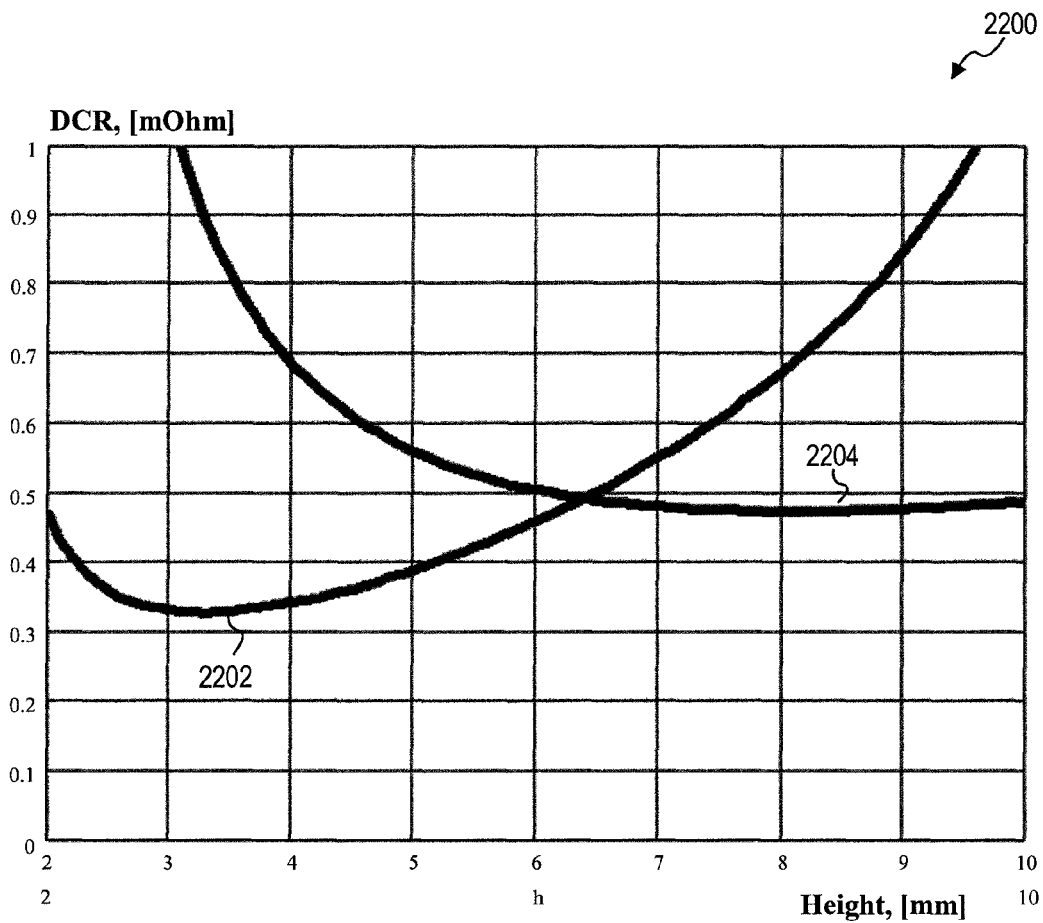
FIG. 22 shows one graph of winding resistance versus coupled inductor height.

Additionally, coupled inductor 800 enables windings 816 to have a short length and a wide width, thereby decreasing winding resistance and associated power loss. In contrast, some other coupled inductors require much longer windings, as for example shown by the length of winding 104 of coupled inductor 100 (see FIG. 4). FIG. 22 shows one graph 2200 of DC winding resistance versus inductor height. Curve 2202 corresponds to an embodiment of coupled inductor 800, and curve 2204 corresponds to an embodiment of coupled inductor 100. Both inductors of FIG. 22 have the same core cross section and the same winding thickness. However, the embodiment of coupled inductor 800 advantageously has a smaller minimum DC resistance and achieves the minimum resistance at a smaller inductor height than the embodiment of coupled inductor 100.

Figure 23:
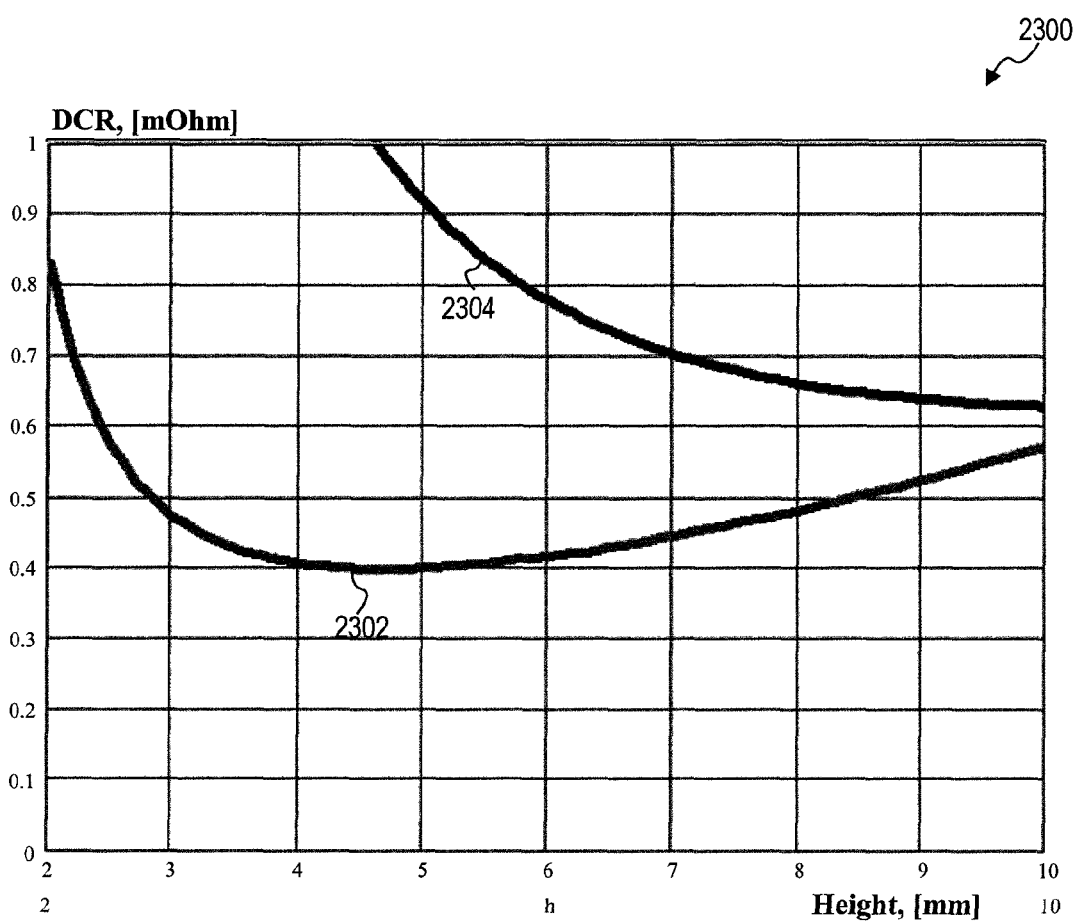
FIG. 23 shows one graph of winding resistance versus coupled inductor height.

Furthermore, it is generally desirable to decrease core loss by increasing magnetic core cross section. In contrast with some other coupled inductors, some embodiments of coupled inductor 800 enable core area to be significantly increased without a large increase in DC winding resistance. For example, FIG. 23 shows one graph 2300 of DC winding resistance versus inductor height. Curve 2302 corresponds to an embodiment of coupled inductor 800, and curve 2304 corresponds to an embodiment of coupled inductor 100. The inductors of FIG. 23 have twice the core cross section as the inductors of FIG. 22. As seen by comparing FIGS. 22 and 23, doubling core cross section significantly increases winding resistance of coupled inductor 100. However, although coupled inductor 800's winding resistance increases modestly at very small inductor heights, its winding resistance decreases at larger inductor heights. Accordingly, some embodiments of coupled inductor 800 advantageously allow winding conduction losses and core losses to be simultaneously decreased by increasing core cross section.

Moreover, some embodiments of coupled inductor 800 do not require thin magnetic core pieces, thereby facilitating mechanical strength, manufacturing, shipping, handling, and/or assembly. In contrast, some other coupled inductors require thin core pieces that are fragile, difficult to manufacture, ship, handle, and/or assemble. For example, core 102 of coupled inductor 100 (FIG. 1) includes a thin top piece and a thin bottom piece.

Figure 24:
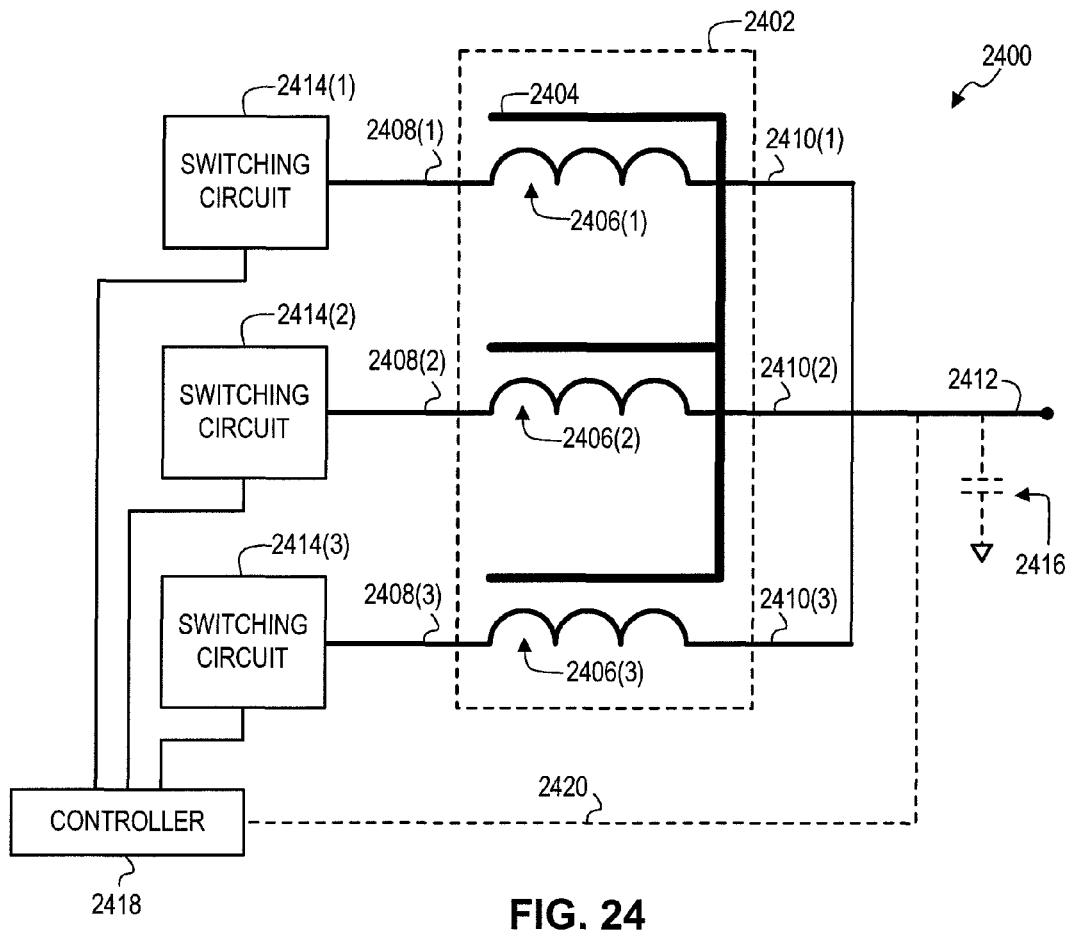
FIG. 24 shows one power supply, according to an embodiment.

One possible application of coupled inductor 800 is in power supplies, such as power supply 2400 of FIG. 24. Although power supply 2400 is shown as having three phases, power supply 2400 can have any number of phases greater than one.

Power supply 2400 includes a coupled inductor 2402, which is an embodiment of coupled inductor 800. Coupled inductor 2402 includes a magnetic core 2404 and windings 2406. Each winding 2406 has a first end 2410 electrically coupled to a common first node 2412. Each first end 2410 optionally extends from one common side of inductor 2400. Each winding 2406 further includes a second end 2408 electrically coupled to a respective switching circuit 2414. Each second end 2408 optionally extends from another common side of inductor 2400. Switching circuits 2414 are configured and arranged to switch second end 2408 of their respective winding 2406 between at least two different voltages. Controller 2418 controls switching circuits 2414, and controller 2418 optionally includes a feedback connection 2420, such as to first node 2412. First node 2412 optionally includes a filter 2416.

Power supply 2400 can be configured and arranged to have a variety of configurations. For example, switching circuits 2414 may switch second end 2408 of their respective winding 2406 between an input voltage node (not shown) and ground, such that power supply 2400 is configured as a buck converter, first node 2412 is an output voltage node, and filter 2416 is an output filer. In this example, each switching circuit 2414 includes at least one high side switching device and at least one catch diode, or at least one high side switching device and at least one low side switching device. In the context of this document, a switching device includes, but is not limited to, a bipolar junction transistor, a field effect transistor (e.g., a N-channel or P-channel metal oxide semiconductor field effect transistor, a junction field effect transistor, or a metal semiconductor field effect transistor), an insulated gate bipolar junction transistor, a thyristor, or a silicon controlled rectifier.

As another example, power supply 2400 can be configured as a boost converter such that node 2412 is an input power node, and switching circuits 2414 switch second end 2408 of their respective winding 2406 between an output voltage node (not shown) and ground. Additionally, power supply 2400 can be configured, for example, as a buck-boost converter such that node 2412 is a common node, and switching circuits 2414 switch second end 2408 of their respective winding 2406 between an output voltage node (not shown) and an input voltage node (not shown).

Furthermore, as yet another example, power supply 2400 may form an isolated topology. For example, each switching circuit 2414 may include a transformer, at least one switching device electrically coupled to the transformer's primary winding, and a rectification circuit coupled between the transformer's secondary winding and second end 2408 of a respective winding 2406. The rectification circuit optionally includes at least one switching device to improve efficiency.

Figure 25:
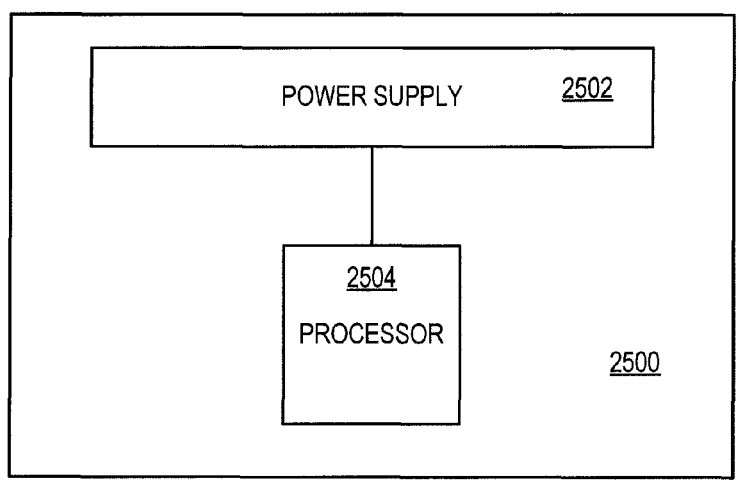
FIG. 25 shows one computing apparatus, according to an embodiment.

One possible application of power supply 2400 is in a computing apparatus, such as computing apparatus 2500 of FIG. 25. Computing apparatus 2500 is, for example, a personal computer or server motherboard, a server processing board, a mobile telephone with computing capability, or a personal digital assistant. Power supply 2502, which is an embodiment of power supply 2400, at least partially powers processor 2504.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. An M-phase coupled inductor, M being an integer greater than one, the coupled inductor comprising:
   a magnetic core formed of core material, the magnetic core including:
      first and second opposing end magnetic elements,
      M adjacent inner legs, each of the M adjacent inner legs disposed between and connecting the first and second opposing end magnetic elements, and
      a first outer leg:
         connected to the first opposing end magnetic element at a first end thereof outside of the M adjacent inner legs,
         connected to an innermost edge of the first opposing end magnetic element nearest an innermost edge of the second opposing end magnetic element, and extending along a first lengthwise direction toward a first end of the second opposing end magnetic element outside of the M adjacent inner legs, and
         including a first gap along the first lengthwise direction, the first gap having a thickness less than a distance between the respective innermost edges of the first and second opposing end magnetic elements at their respective first ends, the first gap including first gap material having lower magnetic permeability than the core material; and
   M windings, each winding wound at least partially around at least a portion of a respective one of the inner legs, each winding having a respective leakage inductance,
   wherein the first gap provides a path for leakage flux, the leakage flux contributing to the respective leakage inductances of the M windings, and
   wherein each inner leg has a respective width, and adjacent inner legs are separated by a separation distance that is less than 25% of the respective width of either adjacent inner leg.

2. The coupled inductor of claim 1, M being an integer greater than two.

3. The coupled inductor of claim 2, the magnetic core further including a second outer leg:
   connected to the first opposing end magnetic element at a second end thereof outside of the M adjacent inner legs, the second end of the first opposing end magnetic element being different from the first end of the first opposing end magnetic element,
   connected to the innermost edge of the first opposing end magnetic element, and extending along a second lengthwise direction toward a second end of the second opposing end magnetic element outside of the M adjacent inner legs, the second end of the second opposing end magnetic element being different from the first end of the second opposing end magnetic element, and
   including a second gap along the second lengthwise direction, the second gap having a thickness less than a distance between the respective innermost edges of the first and second opposing end magnetic elements at their respective second ends,
   the second gap including second gap material having lower magnetic permeability than the core material, the M adjacent inner legs being disposed between the first and second outer legs, the second gap providing an additional path for leakage flux.

4. The coupled inductor of claim 3, adjacent inner legs being separated by a separation distance that is less than 10% of the respective width of either adjacent inner leg.

5. The coupled inductor of claim 3, each winding being a single layer and single turn winding having substantially rectangular cross section.

6. The coupled inductor of claim 3, the second gap material being different than the first gap material.

7. The coupled inductor of claim 3, the second gap material being the same as the first gap material.

8. The coupled inductor of claim 3, at least one of the gap materials including a non-magnetic material selected from the group consisting of air, insulating tape, plastic, glue, and paper.

9. The coupled inductor of claim 1, the magnetic core further including a second outer leg:
   connected to the first opposing end magnetic element at a second end thereof outside of the M adjacent inner legs, the second end of the first opposing end magnetic element being different from the first end of the first opposing end magnetic element,
   connected to the innermost edge of the first opposing end magnetic element, and extending along a second lengthwise direction toward a second end of the second opposing end magnetic element outside of the M adjacent inner legs, the second end of the second opposing end magnetic element being different from the first end of the second opposing end magnetic element, and including a second gap along the second lengthwise direction, the second gap having a thickness less than a distance between the respective innermost edges of the first and second opposing end magnetic elements at their respective second ends,
the second gap including second gap material having a lower magnetic permeability than the core material, the M adjacent inner legs being disposed between the first and second outer legs, the second gap providing an additional path for leakage flux.

10. The coupled inductor of claim 9, the first lengthwise direction being parallel to the second lengthwise direction.

11. An M-phase power supply, M being an integer greater than one, the power supply comprising:
a coupled inductor including:
a magnetic core formed of core material, the magnetic core including:
first and second opposing end magnetic elements,
M adjacent inner legs, each of the M adjacent inner legs disposed between and connecting the first and second opposing end magnetic elements, and
a first outer leg:
connected to the first opposing end magnetic element at a first end thereof outside of the M adjacent inner legs,
connected to an innermost edge of the first opposing end magnetic element nearest an innermost edge of the second opposing end magnetic element, and extending along a first lengthwise direction toward a first end of the second opposing end magnetic element outside of the M adjacent inner legs, and
including a first gap along the first lengthwise direction, the first gap having a thickness less than a distance between the respective innermost edges of the first and second opposing end magnetic elements at their respective first ends, the first gap including first gap material having lower magnetic permeability than the core material, and
M windings, each winding wound at least partially around at least a portion of a respective one of the inner legs, each winding having a respective first end, a respective second end, and a respective leakage inductance, each first end electrically coupled to a common first node,
wherein the first gap provides a path for leakage flux, the leakage flux contributing to the respective leakage inductances of the M windings; and
M switching circuits, each switching circuit electrically coupled to the second end of a respective winding and configured and arranged to switch the second end between at least two different voltages.

12. The power supply of claim 11, M being an integer greater than two.

13. The power supply of claim 12, the magnetic core further including a second outer leg:
connected to the first opposing end magnetic element at a second end thereof outside of the M adjacent inner legs, the second end of the first opposing end magnetic element being different from the first end of the first opposing end magnetic element,
connected to the innermost edge of the first opposing end magnetic element, and extending along a second lengthwise direction toward a second end of the second opposing end magnetic element outside of the M adjacent inner legs, the second end of the second opposing end magnetic element being different from the first end of the second opposing end magnetic element, and
including a second gap along the second lengthwise direction, the second gap having a thickness less than a distance between the respective innermost edges of the first and second opposing end magnetic elements at their respective second ends,
the second gap including second gap material having lower magnetic permeability than the core material, at least one of the gap materials including a non-magnetic material selected from the group consisting of air, insulating tape, plastic, glue, and paper, the second gap providing an additional path for leakage flux.

14. The power supply of claim 13, each inner leg having a respective width, adjacent inner legs being separated by a separation distance that is less than 25% of the respective width of either adjacent inner leg.

15. The power supply of claim 14, each winding being a single layer and single turn winding having substantially rectangular cross section.

16. The power supply of claim 13, each first end extending from a first side of the coupled inductor, and each second end extending from a second side of the coupled inductor.

17. The power supply of claim 13, at least two first ends extending from different respective sides of the coupled inductor.

18. The power supply of claim 13, at least two second ends extending from different respective sides of the coupled inductor.

19. The power supply of claim 13, each winding being a single layer and single turn winding having substantially rectangular cross section.

20. The power supply of claim 19, each switching circuit comprising:
at least one switching device;
a transformer including a primary winding and a secondary winding, the primary winding electrically coupled to the at least one switching device; and
a rectification circuit electrically coupled between the secondary winding and the second end of the respective winding of the switching circuit.

21. The power supply of claim 20, the rectification circuit including at least one switching device.

22. The power supply of claim 19, the first node being an input voltage node.

23. The power supply of claim 19, the first node being an output voltage node.

24. The power supply of claim 19, the first node being a ground node.

25. A computing apparatus, comprising:
a computer processor; and
an M-phase power supply electrically coupled to the processor for at least partially powering the processor, M being an integer greater than one, the power supply including:
a coupled inductor including:
a magnetic core formed of core material, the magnetic core including:
first and second opposing end magnetic elements,
M adjacent inner legs, each of the M adjacent inner legs disposed between and connecting the first and second opposing end magnetic elements, and
a first outer leg:
connected to the first opposing end magnetic element at a first end thereof outside of the M adjacent inner legs, connected to an innermost edge of the first opposing end magnetic element nearest an innermost edge of the second opposing end magnetic element, and extending along a first lengthwise direction toward a first end of the second opposing end magnetic element outside of the M adjacent inner legs, and including a first gap along the first lengthwise direction, the first gap having a thickness less than a distance between the respective innermost edges of the first and second opposing end magnetic elements at their respective first ends, the first gap including first gap material having lower magnetic permeability than the core material; and M windings, each winding wound at least partially around at least a portion of a respective one of the inner legs, each winding having a respective first end, a respective second end, and a respective leakage inductance, each first end electrically coupled to a common first node, and wherein the first gap provides a path for leakage flux, the leakage flux contributing to the respective leakage inductances of the M windings; and M switching circuits, each switching circuit electrically coupled to the second end of a respective winding and configured and arranged to switch the second end between at least two different voltages.

26. The computing apparatus of claim 25, M being an integer greater than two.

27. The computing apparatus of claim 26, the magnetic core further including a second outer leg:
connected to the first opposing end magnetic element at a second end thereof outside of the M adjacent inner legs, the second end of the first opposing end magnetic element being different from the first end of the first opposing end magnetic element, connected to the innermost edge of the first opposing end magnetic element, and extending along a second lengthwise direction toward a second end of the second opposing end magnetic element outside of the M adjacent inner legs, the second end of the second opposing end magnetic element being different from the first end of the second opposing end magnetic element, and including a second gap along the second lengthwise direction, the second gap having a thickness less than a distance between the respective innermost edges of the first and second opposing end magnetic elements at their respective second ends, the second gap including second gap material having lower magnetic permeability than the core material, at least one of the gap materials including a non-magnetic material selected from the group consisting of air, insulating tape, plastic, glue, and paper, the second gap providing an additional path for leakage flux.

28. The computing apparatus of claim 27, each winding being a single layer and single turn winding having substantially rectangular cross section.

29. The computing apparatus of claim 27, each inner leg having a respective width, adjacent inner legs being separated by a separation distance that is less than 25% of the respective width of either adjacent inner leg.

30. The computing apparatus of claim 29, each winding being a single layer and single turn winding having substantially rectangular cross section.

31. The coupled inductor of claim 1, each of the M adjacent inner legs being arranged in parallel.

32. An M-phase coupled inductor, M being an integer greater than one, the coupled inductor comprising:
a magnetic core formed of core material selected from the group consisting of a ferrite material and a powdered iron material, the magnetic core including:
first and second opposing end magnetic elements,
M adjacent inner legs, each of the M adjacent inner legs disposed between and connecting the first and second opposing end magnetic elements, and
a first outer leg:
connected to the first opposing end magnetic element at a first end thereof outside of the M adjacent inner legs,
connected to an innermost edge of the first opposing end magnetic element nearest an innermost edge of the second opposing end magnetic element, and extending along a first lengthwise direction toward a first end of the second opposing end magnetic element outside of the M adjacent inner legs, and
including a first gap along the first lengthwise direction, the first gap having a thickness less than a distance between the respective innermost edges of the first and second opposing end magnetic elements at their respective first ends, the first gap including first gap material having lower magnetic permeability than the core material; and
M windings, each winding wound at least partially around at least a portion of a respective one of the inner legs, each winding having a respective leakage inductance,
wherein the first gap provides a path for leakage flux, the leakage flux contributing to the respective leakage inductances of the M windings.

33. The coupled inductor of claim 32, M being an integer greater than two.

34. The coupled inductor of claim 33, the magnetic core including a second outer leg:
connected to the first opposing end magnetic element at a second end thereof outside of the M adjacent inner legs, the second end of the first opposing end magnetic element being different from the first end of the first opposing end magnetic element,
connected to the innermost edge of the first opposing end magnetic element, and extending along a second lengthwise direction toward a second end of the second opposing end magnetic element outside of the M adjacent inner legs, the second end of the second opposing end magnetic element being different from the first end of the second opposing end magnetic element, and
including a second gap along the second lengthwise direction, the second gap having a thickness less than a distance between the respective innermost edges of the first and second opposing end magnetic elements at their respective second ends, the second gap including second gap material having lower magnetic permeability than the core material, the M adjacent inner legs being disposed between the first and second outer legs, the second gap providing an additional path for leakage flux.

35. The coupled inductor of claim 34, each inner leg having a respective width, adjacent inner legs being separated by a separation distance that is less than 25% of the respective width of either adjacent inner leg.

* * * * *